S. SHREFFLER, Jr.
Farm-Gate.
No. 207,078.            Patented Aug. 13, 1878.
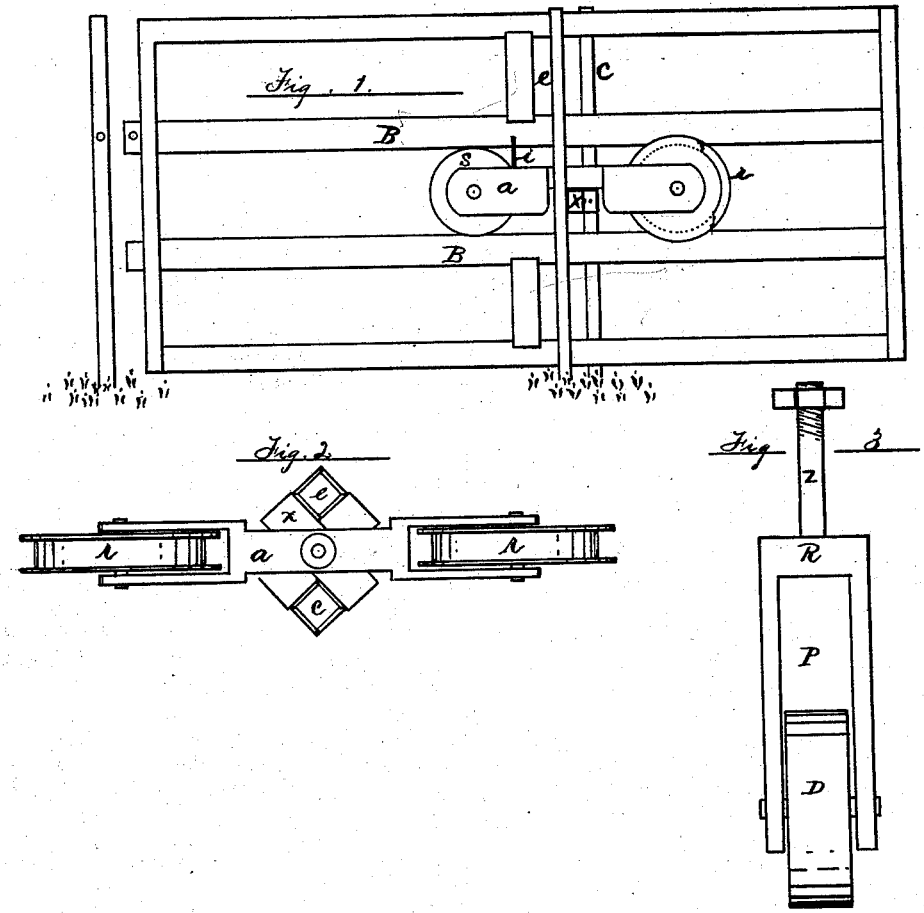
Witnesses
Thos H Hutchins
Wm J Hutchins
Inventor
Samuel Shreffler Jr

UNITED STATES PATENT OFFICE.

SAMUEL SHREFFLER, JR., OF MORRIS, ILLINOIS.

IMPROVEMENT IN FARM-GATES.

Specification forming part of Letters Patent No. 207,078, dated August 13, 1878; application filed May 7, 1878.

*To all whom it may concern:*

Be it known that I, SAMUEL SHREFFLER, Jr., of the city of Morris, in Grundy county, in the State of Illinois, have invented certain Improvements in Farm-Gates, the description and operation of which I will proceed to explain, reference being had to the annexed specification, in which—

Figure 1 is a side elevation; Fig. 2, a plan view on the top of the rollers on which the gate travels, and Fig. 3 a front elevation of a single roller and swivel in which the gate may swing.

The gate is of the kind that slides or rolls back to a point where it will balance and then swing half-way around.

In this invention the gate is so arranged that it travels back and forth on a pair of grooved rollers between two of its bars, so arranged as to prevent the corner of the gate from falling to the ground as soon as it is let loose from its catch to be swung around, and to hold it in a horizontal position while at any point.

In the drawings, c c represent two posts, one set a little forward of the other as regards the length of the gate, so that the X-shaped casting x may be fixed in between and firmly bolted to the posts c, so as to form a rest for the swivel to swing on from a pivot at the center, as shown more particularly in Fig. 2, the X-shaped piece x having so large a surface to prevent much rocking of the swivel a as it turns.

The gate rolls in the grooved wheels r or on plain wheels D, with a pin, i, to answer the place of the flanges on the grooved wheels r to hold the gate B from getting off, if desired, the plain wheels being easier to place in between the bars. As the gate B is rolled back so as to be disengaged from its catch, it may be caused to turn on this swivel-hinge at any point, whether at a point where it balances or not, as it is held horizontal and free from the ground.

In case it may be desired to provide only an easy way for rolling the gate back without regard to its being held horizontal by the hinge, the swivel R with a single wheel, D, (shown at Fig. 3,) may be used, the shank z passing up through the piece x and held by the nut on the top, and the upper bar of the gate traveling on the wheel D through the opening P, this device answering the same purpose as the other, only making it necessary to carry the gate by hand to prevent its striking the ground until it is slid back to a joint, where it balances.

By rolling the gate B on the rollers it runs very easily and swings with very little effort, making one of the simplest and most effective gates of its class.

Having thus described my invention, what I claim as new, and desire to secure by Letters Patent, is as follows:

The X-shaped block x, bolted to and uniting the two diagonally-arranged posts, as shown, to support the swivel and grooved rollers, and allow the gate to roll and swing between the posts c, in the manner and for the purpose set forth.

SAMUEL SHREFFLER, JR.

Witnesses:
   THOS. H. HUTCHINS,
   WM. J. HUTCHINS.